(12) United States Patent
Yuan

(10) Patent No.: US 8,870,452 B2
(45) Date of Patent: Oct. 28, 2014

(54) OPTICAL SYSTEM AND FOCUSING STRUCTURE FOR INFRARED THERMOMETER

(76) Inventor: Guobing Yuan, Shanghai (CN)

( * ) Notice: Subject to any disclaimer, the term of this patent is extended or adjusted under 35 U.S.C. 154(b) by 130 days.

(21) Appl. No.: 13/695,751

(22) PCT Filed: Apr. 15, 2011

(86) PCT No.: PCT/CN2011/072851
§ 371 (c)(1),
(2), (4) Date: Nov. 1, 2012

(87) PCT Pub. No.: WO2011/137713
PCT Pub. Date: Nov. 10, 2011

(65) Prior Publication Data
US 2013/0051424 A1 Feb. 28, 2013

(30) Foreign Application Priority Data

May 6, 2010 (CN) .......................... 2010 1 0164390

(51) Int. Cl.
G01J 5/08 (2006.01)
G01J 5/04 (2006.01)

(52) U.S. Cl.
CPC .................. G01J 5/04 (2013.01); G01J 5/0859 (2013.01); G01J 5/08 (2013.01); G01J 5/048 (2013.01); G01J 5/0806 (2013.01); G01J 5/084 (2013.01)
USPC ........................................................ 374/130

(58) Field of Classification Search
None
See application file for complete search history.

(56) References Cited

U.S. PATENT DOCUMENTS

| 3,619,059 A * | 11/1971 | Muller et al. | 356/45 |
|---|---|---|---|
| 4,215,273 A * | 7/1980 | Frosch et al. | 250/347 |
| 4,632,547 A * | 12/1986 | Kaplan et al. | 356/247 |
| 5,368,392 A * | 11/1994 | Hollander et al. | 374/121 |
| 5,561,294 A * | 10/1996 | Iddan | 250/330 |
| 5,796,517 A * | 8/1998 | Sensui et al. | 359/426 |
| 5,823,679 A * | 10/1998 | Hollander et al. | 374/121 |
| 5,836,694 A * | 11/1998 | Nguyen | 374/130 |
| 5,839,829 A * | 11/1998 | Litvin et al. | 374/121 |
| 6,095,682 A * | 8/2000 | Hollander et al. | 374/121 |
| 6,234,669 B1 * | 5/2001 | Kienitz et al. | 374/130 |
| 6,519,083 B2 * | 2/2003 | Heinrich | 359/422 |
| 6,585,409 B2 * | 7/2003 | Schmidt et al. | 374/121 |
| 6,951,411 B1 * | 10/2005 | Kumar et al. | 362/284 |
| 7,355,178 B2 * | 4/2008 | Everest | 250/338.1 |
| 8,214,010 B2 * | 7/2012 | Courtney et al. | 600/407 |
| 8,228,416 B2 * | 7/2012 | Ueda et al. | 348/335 |
| 8,240,912 B2 * | 8/2012 | Schreher et al. | 374/124 |
| 8,515,516 B2 * | 8/2013 | Kamath et al. | 600/345 |
| 8,548,551 B2 * | 10/2013 | Kamath et al. | 600/345 |
| 8,565,848 B2 * | 10/2013 | Brister et al. | 600/345 |
| 2002/0122248 A1* | 9/2002 | Heinrich | 359/425 |
| 2005/0046711 A1* | 3/2005 | Morimoto | 348/240.2 |
| 2013/0148688 A1* | 6/2013 | Cao et al. | 374/2 |

FOREIGN PATENT DOCUMENTS

| CN | 2476831 Y | 2/2002 |
|---|---|---|
| CN | 2519254 Y | 10/2002 |
| CN | 201166586 Y | 12/2008 |
| JP | 02118609 A * | 5/1990 |
| JP | 03135787 A * | 6/1991 |

* cited by examiner

Primary Examiner — John Fitzgerald
Assistant Examiner — Gregory A Royal
(74) Attorney, Agent, or Firm — Maschoff Brennan

(57) ABSTRACT

An optical system and a focusing structure for an infrared thermometer are provided. The optical system includes a focusing ocular barrel (100) and an objective focusing ring (300), provided at the rear end of an optical probe. The shift of the ocular (101) and the objective (201) can be controlled. The rear end of the probe includes a cap (507), which can be used for locking the detective image distance of the objective (201) and sealing and protecting the portion of the focusing operation.

9 Claims, 3 Drawing Sheets

OPTICAL SYSTEM AND FOCUSING STRUCTURE FOR INFRARED THERMOMETER

FIELD OF THE INVENTION

The invention relates to a non-contact optical thermometer, particularly to an infrared radiation thermometer of an optical system, of which the focusing operations of an eyepiece and an objective are carried out at the back end of an optical probe.

BACKGROUND OF TECHNOLOGY

An infrared radiation thermometer collects the infrared thermal radiation energy of a target via its optical system, the energy is directly or indirectly (via the optical fiber transmission) focused on an infrared temperature measuring sensor and is converted into electric signals, and the electric signals are subjected to subsequent circuit processing so as to display the measuring temperature and output corresponding electric signals. The optical system can have the following forms:

A. the optical system is only provided with an objective incapable of being focused and is generally added with laser beams in the indicating measurement direction. Such structure is the simplest and is mainly applied to easy low-medium-high temperature infrared radiation thermometers;

B. the optical system is provided with an eyepiece and the objective which cannot be focused. The structure is also simple. For instance, the IR-HS portable infrared radiation thermometer produced by Japan CHINO Company is adopted;

C. the objective can be focused at the front end of the probe and the eyepiece cannot be focused at the back end of the probe. Such structure is frequently used in the products with medium temperature and high temperature. For instance, the Marathon series of infrared radiation thermometers produced by U.S. Raytek company, the SR and the Modline 3 series of infrared radiation thermometers produced by U.S. IRCON company;

D. the objective can be focused at the front end of the probe and the eyepiece can be focused at the back end of the probe. Such structure is usually applied to high-end products, which is similar to the technology associated with the invention. For instance, the TR-630 produced by British LAND company and Japan MINOLTA company, the IR-AH portable infrared radiation thermometer and partial IR-CA series of infrared thermometers produced by Japan CHINO company, and the XTIR-F series of optical fiber infrared thermometers produced by Shanghai cooperative physical institute;

E. the objective can be focused at the back end of the probe, but the eyepiece at the back of the probe cannot be focused. Such structure is relatively complicated and is novel as well, which can be seen in few high-end products and is similar to the technology associated with the invention. For instance, the SYSTEM 4(S4 abbr.) series of fixed-type infrared radiation thermometers produced by British LAND company and Modline 5 series of integrated infrared radiation thermometers produced by U.S. IRCON company.

Deficiencies and disadvantages of available technologies:

a. the objective is fixed so that the measured image distance cannot be regulated according to the variation of the measured object distance, resulting in lower resolution of optical focusing;

b. the accurate and effective measured part of the target cannot be aimed, observed and judged due to lack of the eyepiece; when the target turns red due to the bright environmental lighting or the high target temperature, the aiming effect of pointing by the laser red dot on the measured plane can be lost for this reason;

c. the eyepiece cannot be focused, so the observation effect on the aiming circle (or aiming cross) and target imaging on the dividing plane would be influenced due to the vision difference of operators and the optimal optical objective focusing measuring effect also cannot be achieved;

d. the focusing operation of the objective at the front end of the probe would be influenced by assembling and using of an air purging device and a water cooled jacket;

e. the focusing operation part and the movable gap are exposed, which can be easily polluted and permeated by oil steam and dust on the industrial site when used on-line for long term, as a result, instruments are easy to go wrong and the using of the instruments is influenced; additionally, focusing operation part and the movable gap are also inconvenient to wash in maintaining and cleaning process;

f. the objective cannot be locked or is inconvenient to lock and is easy to forgot after being focused, so the measuring result may be changed due to the vibration influence of the workpiece which is subjected to temperature measurement when the objective is used on-line;

g. the existing high-end technology of carrying out focusing operation on the objective at the back of the probe has complex design structure and also has the defects that the eyepiece cannot be focused and the like. For instance, the SYSTEM 4(S4 abbr.) series of fixed-type infrared radiation thermometers produced by British LAND company, wherein the front end of the probe is sealed and the objective is moved and focused by revolving an objective focusing ring at the back end; the components of a focusing transmission structure comprise a casting frame, a focusing ring, a gear set, a transmission connecting rod, a spring, threads, etc; and except the damping effect of the spring, the eyepiece cannot be focused if no focusing locking device is provided.

According to the Modline 5 series of integrated infrared radiation thermometers produced by U.S. IRCON company, the objective is sealed and fixed at the front end of the probe, the focusing operation of the objective is realized by revolving a second-half casing of the probe and making an internal core take the integral linear displacement, an external cable connecting pedestal is fixed on a first-half casing, and a plurality of cable connecting wires inside would be pulled forward and backward in the focusing process; the focusing locking operation is realized by twisting a king bolt of which a base is fixed on the first-half casing of the probe to support the rotary second-half casing of the probe; the requirement on the machining fit precision of the rotary casing is high; and the eyepiece cannot be focused.

SUMMARY OF THE INVENTION

Technical Problems

The mission of the invention is to provide the overall technical scheme that is capable of solving the following problems simultaneously:

The infrared radiation thermometer cannot be influenced by installation and using of the air purging device and the water cooled jacket; both the objective and the eyepiece can be focused; and the movable part for the focusing operation cannot be polluted and permeated by the oil stain steam on the site.

Technical Solutions

The technical proposal used by the invention has the following characteristics:

The back end of the optical probe is designed with an eyepiece slide capable of being stretched and focused and the objective focusing ring capable of be rotationally focused, and it is further designed with a back nut cap of the probe, which can be used for sealing and protecting the whole movable focusing part and locking the measuring image distance of the objective simultaneously.

Advantages of the Invention

Compared with the conventional art, the invention has the following beneficial effects:

1) good operability: the focusing operations for both the eyepiece and the objective can be conveniently and smoothly carried out at the back end of the probe, which are not influenced by the using of the air purging device and the water cooled jacket at all;

2) high reliability: the back seal nut cap has effects of preventing pollution and locking the measuring image distance, thereby improving the reliability of long-term on-line application;

3) high measuring precision and repeatability: with the sequential focusing operations of the eyepiece and the objective, the operators with vision difference are able to obtain the same and optimal visual aiming definition, optical focusing resolution and measuring precision;

4) excellent cleaning maintainability: the fully-sealed probe with the smooth and clean surface is difficult to being polluted, permeate and scale, as a result, it is more convenient to maintain and clean (an external port is additionally protected by the seal turncap when not in used);

5) simplicity: compared with the existing high-end technology that the objective is focused at the back of the probe, the invention has ingenious design, simple structure, easiness for manufacturing, comprehensive function, wide application and strong industrial applicability.

OPTIMAL EMBODIMENT OF THE INVENTION

Figure 1:
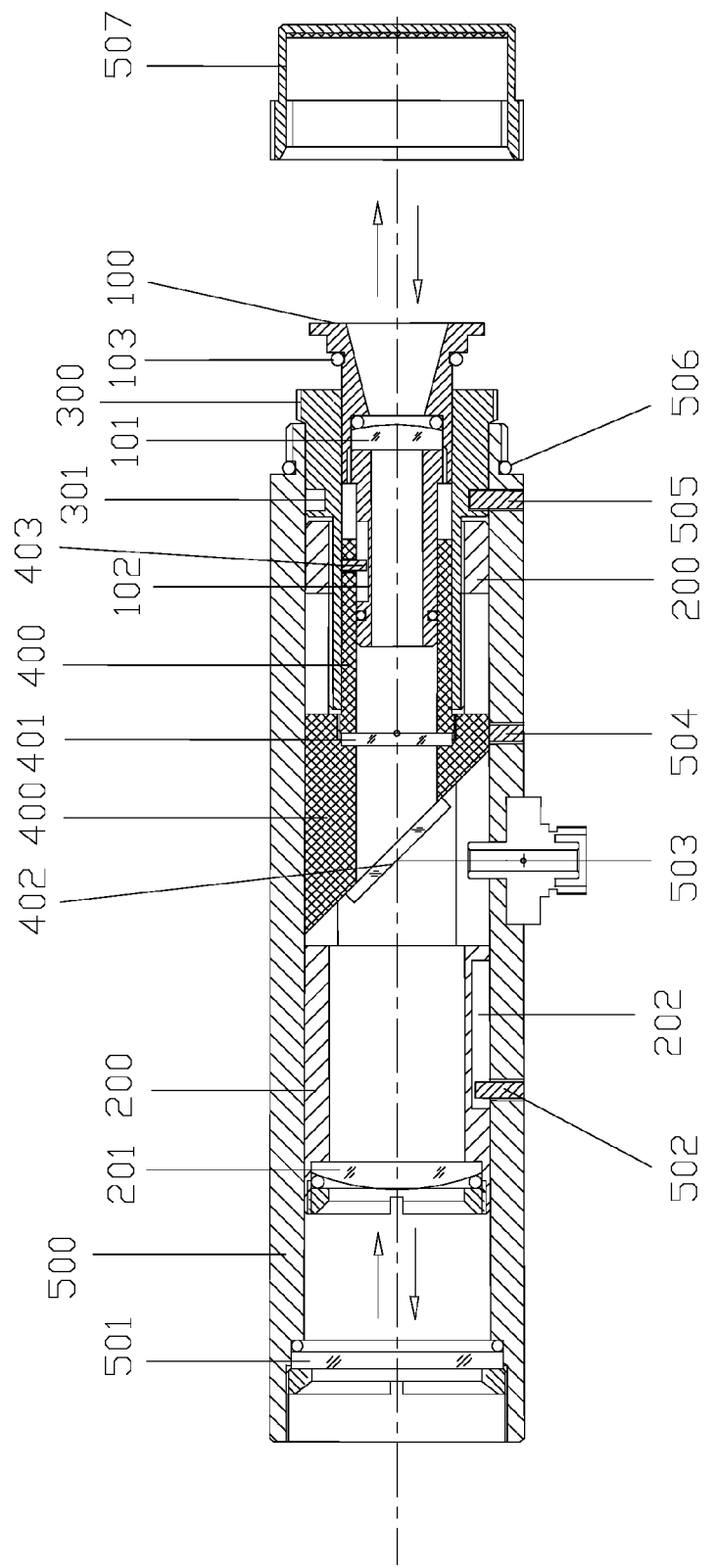
FIG. 1 shows a structure diagram of an optical probe for an optical-fiber infrared radiation thermometer of the invention.

As is shown in FIG. 1, the optimal embodiment discloses an optical probe of an optical-fiber infrared radiation thermometer, wherein:

1. an eyepiece slide (100) capable of being stretched backward and focused includes cylinders on the front and rear sections, which are in threaded connection, and an aiming eyepiece (101) arranged at the middle; the cylinder on the front section is provided with a linear positioning chute (102); and the cylinder on the rear section is used as a visual aiming eyeshade, the end of the visual aiming eyeshade is slightly larger in diameter and an O-shaped rubber ring (103) is embedded in a circular groove at the neck of the visual aiming eyeshade;

2. the rear end of an objective focusing ring (300) capable of rotating left and right is provided with a handheld knurling rotating wheel with slightly large diameter, the middle is provided with a circular positioning chute (301) and a cylinder on the front section is provided with hexagonal external threads;

3. the front end of an objective slide component (200) capable of carrying out linear sliding displacement is provided with an objective (201); a cylinder on the front section is provided with a linear positioning chute (202), the middle section is provided with an up-and-down through chute with two connected sides; and a cylinder on the rear section is provided with hexagonal internal threads;

4. the front and rear sections of a spectroscope component (400) fixed in an optical external slide component (500) are provided with cylinders with different diameters; a reticle (401) with the central aiming circle is embedded at the middle; the front and rear sections of the spectroscope component (400) are in threaded connection; a cylindrical surface is reserved on the cylinder on the front section and both the left and right sides of the cylinder on the front section are chipped into the flat surfaces; the 45-degree slop of the end is provided with a spectroscope (402); the cylinder on the rear section is provided with set screw holes and screws (403);

5. the front end of the optical external slide component (500) is provided with an optical-path seal protective window (501); the front section is provided with set screw holes and screws (502); the outside of the middle section is provided with a connecting interface (503) for an infrared focusing light-spot receiving device and set screw holes and screws (504); the rear section is provided with set screw holes and screws (505); the rear end is provided with external threads and an O-shaped sealing rubber ring (506) is clamped in a tool withdrawing groove; and the rear end is further provided with a protective nut cap (507).

The embodiment includes the following integral combination steps:

Step 1: fitting and assembling the linear chute (102) on the front section of the eyepiece slide (100) with the set screws (403) on the rear section of the spectroscope component (400);

Step 2: fitting and assembling the hexagonal internal and external threads on the back section of the objective slide component (200) and on the front section of the objective focusing ring (300); and embedding the front section of the spectroscope component (400) into the middle chute of the objective slide component (200);

Step 3: connecting the front part and the back part of the spectroscope component (400) in Step 1 and Step 2 in a threaded mode, and installing the reticle (401) at the middle of the spectroscope component (400);

Step 4: inserting the obtained product in Step 3 into the optical external slide component (500); limiting the coaxial slide fit and linear moving distance of the objective slide component (200) by the set screws (502) as well as the linear positioning chute (202); and mounting a connecting port (503) on the middle section of the optical external slide component (500);

Step 5: ensuring the focusing light spots of incident light that is reflected by the objective (201) and the spectroscope (402) to fall at the centre of the connecting port (503), ensuring the focusing light spots of visible light passing through the spectroscope (402) to fall into the central aiming circle on the reticle (401), and fixing the spectroscope component (400) by the set screws (504) of the optical external slide component (500); fitting the set screws (505) with the circular positioning chute (301) on the middle section of the objective focusing ring (300) so as to make the objective focusing ring (300) capable of rotating left and right at the rear end of the optical external slide component (500); and connecting the optical external slide component (500) with the protective nut cap (507) at the back end in a threaded mode so as to complete the integral combination.

The optimal embodiment has the following focusing operation and protection modes:

the eyepiece slide (100) is stretched to change the distance between the eyepiece (101) and the reticle (401) and the aiming circle at the center of the reticle is clearly seen via the aiming eyepiece (101); then the objective slide component (200) is driven to move, the distance between the objective (201) and the reticle (401) is changed, the target imaging on the dividing plane is clearly seen, and an effective temperature measuring area of a target is judged according to the aiming circle; at this moment, the infrared rays radiated by the target are reflected by the spectroscope (402) and the focusing light spots fall at the centre of the connecting port (503); the focusing light spots are transmitted to a far-end infrared temperature measuring sensor by an inserted optical fiber to be received and is subjected to photoelectric conversion and subsequent circuit processing so as to display the measured temperature and output corresponding electric signals. After the above-mentioned operations are completed, the protective nut cap (507) at the rear end can push the eyepiece slide (100) to be axially tightly pressed on the objective focusing ring (300), thereby locking the measuring image distance of the objective (201); the flexible O-shaped rubber ring (103) is used for carrying out elastically fine tuning on the force fit for the objective focusing ring (300) and improving the rotation damp of the objective focusing ring (300), as a result, the whole focusing part with a movable gap can be fully sealed and protected.

DETAILED DESCRIPTION OF THE EMBODIMENT

Figure 2:
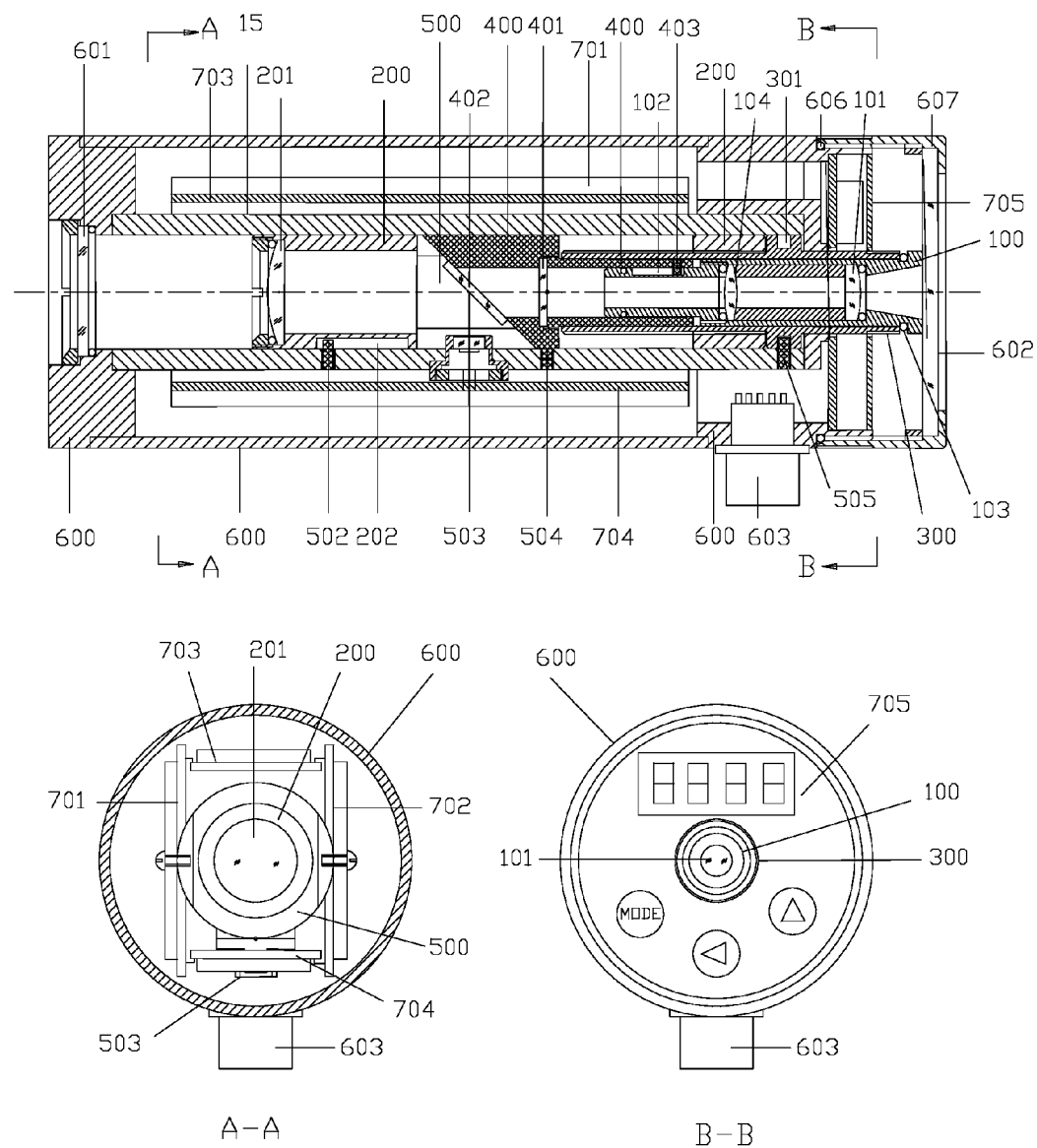
FIG. 2 shows a structure diagram of an integrated infrared radiation thermometer of the invention.
Figure 3:
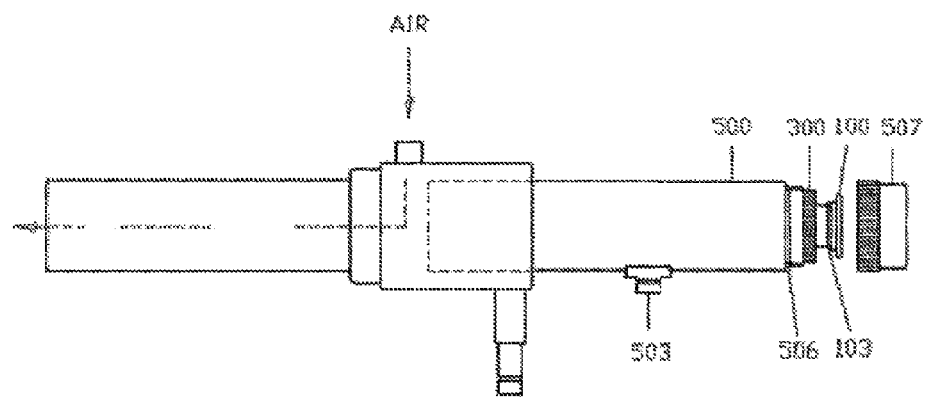
FIG. 3 shows a diagram of the optical probe for the optical-fiber infrared radiation thermometer with an air purging device of the invention.
Figure 4:
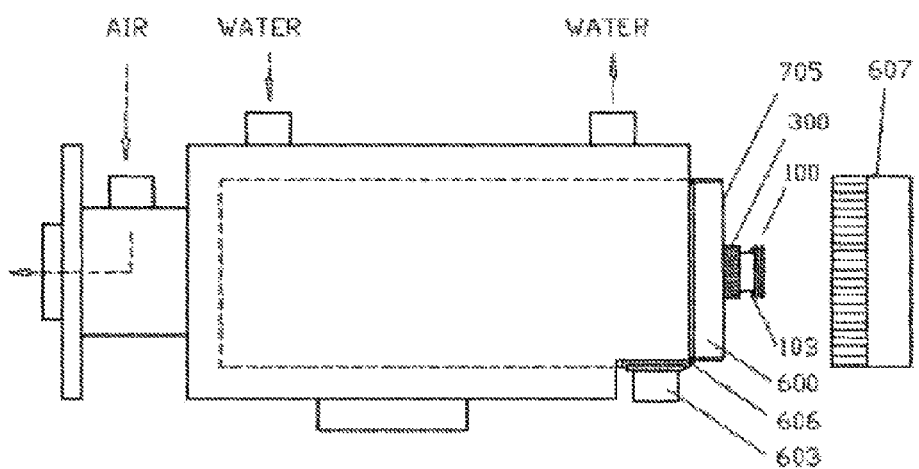
FIG. 4 shows a diagram of the integrated infrared radiation thermometer with the air purging device and the water cooled jacket of the invention.

As is shown in FIG. 2, in the embodiment 2, external components are added on the basis of the optical system so as to constitute a whole integrated infrared radiation thermometer, wherein:

a) four embedded microprocessor system Printed Circuit Board (PCB) boards (701), (702), (703) and (704) with signal processing circuit devices can be provided at most;

b) a human-machine operation interface component (705) includes a 4-bit LED digital display, three functional operation pushbuttons and relative processing circuit devices;

c) for an integrated machine casing (600), the front end is provided with an optical-path seal protective window (601), and the rear end is provided with an O-shaped seal rubber ring (606), a matched rear whirl cap (607) with observation window glass (602) and an external cable socket (603).

In the embodiment 2 in FIG. 2, the structure matching between the installation position of the added parts and the optical system of the invention is clearly shown. It's not necessary for the optical external slide component (500) that is sealed and protected into the integrated machine casing (600) to be provided with the front optical-path seal protective window (501), the O-shaped seal rubber ring (506) and the rear protective nut cap (507); the connecting port (503) can be directly used as the socket sleeve for mounting the infrared temperature measuring sensor; and the eyepiece slide (100) is matched with the installation of the human-machine operation interface component (705), which can select to adopt the eyepiece (101) with longer focal distance or adopt the combination of the eyepieces (101) and (104) to lengthen the focal distance. Apart from the mentioned modifications, the structure principle, the focusing operation mode and the locking and protecting characteristics are totally as same as those in the embodiment 1. The circuit part is not illustrated in details here since it doesn't relate to the invention contents.

A battery handle is additionally arranged on the said integrated infrared radiation thermometer to change the power supply mode into the battery supply mode. A handheld infrared radiation thermometer can be formed by deleting the rear whirl cap (607).

Part of the signal processing circuits or the human-machine operation interface in the integrated infrared radiation thermometer is separated so as to combine another single remote electric signal processing/displaying/controller; and the rest part is an optical temperature measuring probe with the infrared temperature measuring sensor and partial electric signal processing circuits. Moreover, a set of split-type infrared radiation thermometer is formed by adding a middle connecting cable.

It can be seen that the optical system and its focusing structure of the invention can be used for constructing various forms of infrared radiation thermometers.

INDUSTRIAL APPLICABILITY

Until so far, various types of online infrared radiation thermometers are designed and manufactured for the purpose of industrial application. The thermometers have different emphasis and limitations on the aspects of operating characteristics and use occasions, wherein:

Various optical probes of the optical-fiber infrared radiation thermometers have simple design and are internally provided with no sensors and other electrical apparatus. Besides, visual aiming and optical focusing are not used for such optical probes. The probes have the advantages of full sealing and capability of working under the high-temperature environment without water cooling; however, the probes are deficient in low resolution;

The insides of the probes of the integrated-type and split-type infrared radiation thermometers are provided with sensors and other electric apparatuses and the integrated-type and split-type infrared radiation thermometers can work in a high-temperature environment normally only through an auxiliary water cooling or air cooling device, and thus, the additional use cost can be caused. Most probes of advanced instruments with higher optical resolution adopt a visual aiming structure of focusing the objective at the front end, and the focusing operation of the probes can be influenced and is very inconvenient when the probes are used on the industrial site where the water cooling or the air purging is required.

At present, various well-known brands of advanced instruments, such as the SYSTEM 4 series of infrared radiation thermometers produced by British LAND Company and the Modline 5 series of infrared radiation thermometers produced by U.S. IRCON Company, which adopt the structure of focusing the objective at rear end, have complex structure and high price. Additionally, the advanced instruments have the defects that the objective cannot be focused (the best visual resolution cannot be guaranteed when users with different eyesight carry out the focusing operation) and the full sealing of the probe also cannot be achieved. Additional use cost for the water cooling device can be caused when the advanced instruments are used in the industrial high temperature environment. The market price of the anti-explosion infrared radiation thermometer, such as the Modline 5 infrared radiation thermometer produced by U.S. IRCON Company, is much higher than that of the non-explosion one on the polycrystalline silicon production sites with higher anti-explosion requirement and higher precision measuring requirement.

According to the infrared radiation thermometer, particularly the optical fiber-type probe, which is described by the invention, both the eyepiece and the objective can be focused at the rear part of the probe and the same best visual resolution and the optimal optical measuring precision of the system can be achieved and are totally not influenced by the air purging device at the front end when users with different eyesight carry out the focusing operation. The position of the focused objective can be conveniently locked and sealed by the cap at the rear end of the probe and can be immune to the corrosion of the vibration and oil stain steam at the site. The probe can be used in the high temperature environment without the help of the water cooling device and has good repeatability and long-term stability for the target measuring under high temperature. As long as the transmission fiber passes through the anti-explosion area, the probe can be trustingly applied to the high precision anti-explosion temperature testing for the production of polycrystalline silicon.

To sum up, the invention effectively integrates and surpasses the advantages of the optical probes of various existing infrared radiation thermometers by a simple structural design method. Particularly, the optical-fiber probe has higher optical resolution, full sealing property, no influence of the application of the air purging device on the focusing of the objective, high temperature resistance, vibration resistance and anti-explosion performance. When the optical-fiber probe is used under different occasions (currently it can be applicable to the target temperature range of 100 DEG C. to 3,000 DEG C.), the applicability and generality of the optical-fiber probe on the industrial aspect are greatly improved; and the probe has no other additional use cost except the cost of air purging.

The invention claimed is:

1. An optical system for an infrared radiation thermometer and its focusing structure, including an eyepiece slide, an objective slide component, an objective focusing ring, a spectroscope component and an optical outer slide component, wherein:
    an inner cavity of the optical outer slide component is provided with the spectroscope component and the objective slide component,
    a connecting interface for an infrared focusing light-spot receiving device is arranged outside the optical outer slide component,
    the back end of the optical outer slide component is provided with the objective focusing ring and the eyepiece slide that are coaxially piled and is further provided with a protective nut cap,
    an eyepiece can be shifted and focused by stretching the eyepiece slide at the rear end of the optical outer slide,
    an objective can be shifted and focused by rotating the objective focusing ring,
    the nut cap at the rear end can be used for locking the measurement image distance of the objective and implementing fully-sealed protection on the whole focusing operation position, and
    the optical system can be used as an optical probe of the infrared radiation thermometer and can also be used for constructing various other types or forms of infrared radiation thermometers.

2. The optical system and the focusing structure for the infrared radiation thermometer according to claim 1, wherein:
    the middle of the eyepiece slide is provided with the aiming eyepiece, and an visual aiming eyeshade at the rear end of the eyepiece slide has a slightly larger diameter and can be stretched and focused;
    the objective focusing ring can be pressed tightly and locked when the eyeshade is pushed forwards by the nut cap; and
    a circular groove at the neck of the eyepiece slide is embedded with an O-shaped rubber ring which can be used for carrying out elastically fine tuning on the force fit and improving the rotation damp of the objective focusing ring.

3. The optical system and the focusing structure for the infrared radiation thermometer according to claim 1, wherein:
    the front section of the objective focusing ring and the back section of the objective slide component are in transmission fit and the objective focusing ring can push the objective slide component to do linear movement when rotating;
    the middle section of the objective focusing ring is provided with a circular chute for being positioned and arranged in the optical outer slide component;
    the back end of the objective focusing ring is slightly larger in diameter, and is provided with knurling and is leant against the outer end of the optical outer slide component for manual revolving operation; and
    the centre axis part of the objective focusing ring is hollow, without influencing the installation and the movement of the eyepiece slide.

4. The optical system and the focusing structure for the infrared radiation thermometer according to claim 1, wherein:
    the front end of the objective slide component is provided with the objective;
    the middle section of the objective slide component is provided with a chute with two sides penetrated and connected, which can contain the spectroscope component; and
    the back section of the objective slide component and the front section of the objective focusing ring are in transmission fit and the objective focusing ring can drive the objective slide component to do linear movement when rotating.

5. The optical system and the focusing structure for the infrared radiation thermometer according to claim 1, wherein:
    the 45-degree slope at the end of the spectroscope component is provided with a spectroscope, the front and rear sections of the spectroscope component are in threaded connection and the middle of the spectroscope component is provided with a reticle;
    the two sides on the front section of the spectroscope component are cylindrical surfaces and the two sides of the spectroscope component are flat surfaces; the spectroscope component can both be embedded into the middle chute of the objective slide component and positioned at the middle of the optical outer slide component accurately; and
    the spectroscope component is installed in a mode that the external diameter of the back section of the spectroscope component is in slide fit with the internal diameter of the objective focusing ring and the internal diameter of the back section of the spectroscope component is in slide fit with the external diameter of the front section of the eyepiece slide.

6. The optical system and the focusing structure for the infrared radiation thermometer according to claim 1, wherein:
   the front end of the optical outer slide component is provided with an optical-path seal protective window;
   the front section of the optical outer slide component is provided with set screw holes and screws for fitting the installation of a linear positioning chute on the objective slide component;
   the middle section of the optical outer slide component is provided with the connecting interface for the infrared focusing light-spot receiving device and is also provided with set screw holes and screws for fitting the installation and the positioning of the spectroscope component;
   the back section of the optical outer slide component is provided with set screw holes and screws for fitting the installation of the circular locating chute on the objective focusing ring; and
   the back end of the optical outer slide component is provided with external threads, an O-shaped sealing rubber ring is clamped in a tool withdrawal groove, and the back end of the optical outer slide component is provided with the fitted seal nut cap.

7. The optical system and the focusing structure for the infrared radiation thermometer according to claim 1, wherein:
   in a focusing mode, the operator can adjust the relative distance between the eyepiece and the reticle by stretching the back end of the eyepiece slide and can see a central aiming circle on a dividing plane of the reticle via the aiming eyepiece;
   by revolving the objective focusing ring, the objective slide component can be driven to do linear movement, the relative distance between the objective and the reticle can be adjusted, the target imaging on the dividing plane can be seen, and an effective temperature measuring area of a target can be judged within the aiming circle;
   at this moment, the infrared rays radiated by the target are reflected by the spectroscope, and the focusing light spots fall on the centre of the connecting interface can be transmitted to a far-end infrared temperature measuring sensor by an inserted optical fiber to be received, and are subjected to photoelectric conversion and subsequent circuit processing so as to display a measured temperature and output corresponding electric signals; and
   when being used for non optical fiber transmission temperature measurement, the connecting interface can be used as a socket sleeve for directly mounting the infrared temperature measuring sensor.

8. The optical system and the focusing structure for the infrared radiation thermometer according to claim 1, wherein:
   in a protection mode, the protective nut cap at the back of the probe can push the eyepiece slide to be axially pressed tightly on the objective focusing ring, thereby locking the measuring image distance of the objective and sealing and protecting the whole focusing operation position.

9. The optical system and the focusing structure for the infrared radiation thermometer according to claim 1, wherein:
   applicably, the system can be directly used as the optical probe for the infrared radiation thermometer.

* * * * *